(12) United States Patent
Xie et al.

(10) Patent No.: US 8,576,969 B1
(45) Date of Patent: Nov. 5, 2013

(54) METHOD AND APPARATUS FOR DETECTING SYNC MARK

(75) Inventors: Jin Xie, Longmont, CO (US); Mats Oberg, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 259 days.

(21) Appl. No.: 13/151,964

(22) Filed: Jun. 2, 2011

Related U.S. Application Data

(60) Provisional application No. 61/355,489, filed on Jun. 16, 2010.

(51) Int. Cl.
*H04L 7/00* (2006.01)
(52) U.S. Cl.
USPC ........... 375/368; 375/316; 375/354; 375/357; 375/359; 375/360; 375/361; 375/362; 375/364; 375/365; 375/369

(58) Field of Classification Search
USPC ......... 375/316, 354, 357, 359, 360, 361, 362, 375/364, 365, 368, 369
See application file for complete search history.

(56) References Cited

U.S. PATENT DOCUMENTS

| | | | |
|---|---|---|---|
| 6,108,151 A * | 8/2000 | Tuttle et al. ..................... 360/51 |
| 6,657,802 B1 * | 12/2003 | Ashley et al. ................... 360/51 |
| 7,859,782 B1 * | 12/2010 | Lee ................................. 360/51 |
| 8,300,342 B2 * | 10/2012 | Galbraith et al. ............... 360/51 |
| 2005/0002295 A1 * | 1/2005 | Tsunoda .................... 369/47.19 |
| 2007/0297079 A1 * | 12/2007 | Motwani ......................... 360/51 |
| 2009/0110128 A1 * | 4/2009 | Yu et al. ........................ 375/354 |
| 2010/0095190 A1 * | 4/2010 | Kanaya ......................... 714/797 |
| 2011/0021171 A1 * | 1/2011 | Sturza et al. .................. 455/334 |
| 2011/0128994 A1 * | 6/2011 | Beaulieu et al. .............. 375/138 |

* cited by examiner

*Primary Examiner* — Siu Lee (57) ABSTRACT

Aspects of the disclosure provide a method for detecting marks. The method includes receiving a data signal from a channel. Further, the method includes matching the data signal to a template that corresponds to a predetermined pattern transmitted over the channel to detect marks, prior to decoding the data signal into a decoded bit stream.

17 Claims, 8 Drawing Sheets

| THRESHOLD | 0.93 | 0.94 | 0.95 | 0.96 | 0.97 |
|---|---|---|---|---|---|
| TOTAL DETECTION ERRORS | 19 | 13 | 22 | 42 | 112 |

| THRESHOLD | 19 | 20 | 21 | 22 | 23 |
|---|---|---|---|---|---|
| TOTAL DETECTION ERRORS | 74 | 74 | 29 | 29 | 54 |

FIG. 7B

METHOD AND APPARATUS FOR DETECTING SYNC MARK

INCORPORATION BY REFERENCE

This application claims the benefit of U.S. Provisional Application No. 61/355,489, "Detect Syncmark by Matched Filter" filed on Jun. 16, 2010, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Generally, massive storage, such as optical storage, magnetic storage, and the like, stores user data in a bit stream that uses synchronization (sync) marks having a predetermined unique pattern to frame user data. In an example, Blu-ray standard includes a 9T9T pattern in sync marks. The 9T9T pattern has nine zeroes followed by nine ones or nine ones followed by nine zeros. When a reading device detects a 9T9T pattern in a bit stream read from a Blu-ray disc, the reading device knows a starting position of a frame of user data in the bit stream. However, when sync mark detection is based on extracted bit stream, errors in the bit detection can increase sync mark detection errors.

SUMMARY

Aspects of the disclosure provide a method for detecting marks, such as sync marks. The method includes receiving a data signal from a channel. Further, the method includes matching the data signal to a template that corresponds to a predetermined pattern transmitted over the channel to detect marks, prior to decoding the data signal into a decoded bit stream.

To match the data signal to the template, the method includes matching the data signal to a sync mark template that corresponds to a sync mark pattern transmitted over the channel to detect sync marks in the data signal. The sync marks are used to frame user data in the data signal.

Further, in an embodiment, to match the data signal to the template, the method includes matching the data signal to a non-uniformly weighted template. In an example, the method includes convolving the predetermined pattern with a partial response target that characterizes the channel to calculate a first template, and weighting the first template non-uniformly to generate a second template.

According to an aspect of the disclosure, the method includes calculating correlation coefficients between the data signal and the template, and detecting the marks based on the correlation coefficients. It is noted that when a calculated correlation coefficient has negative value, the method includes calculating an absolute value of the correlation coefficient. In an example, to detect the marks based on the correlation coefficients, the method includes detecting peak tops in the correlation coefficients that are larger than neighboring correlation coefficients, and comparing the peak tops to a threshold to detect the marks. In another example, to calculate the correlation coefficients between the data signal and the template, the method includes storing a pre-calculated statistical value of the template, such as Euclidean norm, standard deviation, and the like, and calculating the correlation coefficients using the stored statistical value of the template.

Aspects of the disclosure provide a signal processing circuit. The signal processing circuit includes a pre-decoding portion, a decoder and a mark detection module. The pre-decoding portion is configured to receive a signal corresponding to a bit stream that includes marks having a predetermined pattern, process the signal, and output a data signal for decoding. The decoder is configured to decode the data signal into a decoded bit stream. The mark detection module is configured to match the data signal to a template that corresponds to the predetermined pattern to detect the marks.

Aspects of the disclosure also provide an electronic system. The electronic system includes a pick-up unit, a pre-decoding portion, a decoder, and a mark detection module. The pick-up unit is configured to generate a signal corresponding to a bit stream. The bit stream includes marks having a predetermined pattern. The pre-decoding portion is configured to process the signal, and output a data signal for decoding. The decoder is configured to decode the data signal into a decoded bit stream. The mark detection module is configured to match the data signal to a template that corresponds to the predetermined pattern transmitted over a channel to detect the marks. In an example, the channel includes the pick-up unit and the pre-decoding portion.

BRIEF DESCRIPTION OF THE DRAWINGS

Various embodiments of this disclosure that are proposed as examples will be described in detail with reference to the following figures, wherein like numerals reference like elements, and wherein.

DETAILED DESCRIPTION OF EMBODIMENTS

Figure 1:
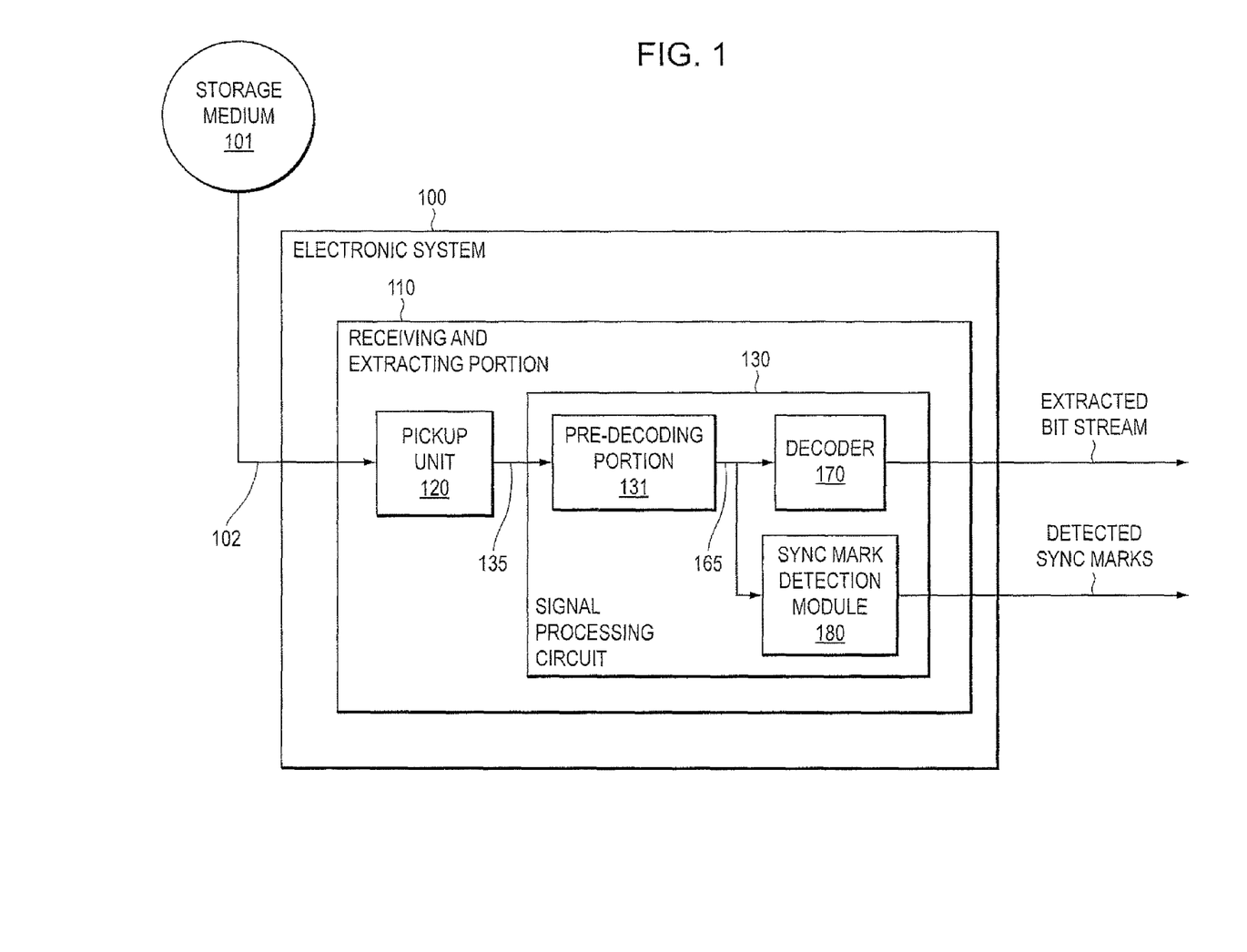
FIG. 1 shows a block diagram of an electronic system example 100 according to an embodiment of the disclosure.

FIG. 1 shows a block diagram of an electronic system example 100 according to an embodiment of the disclosure. The electronic system 100 includes a receiving and extracting portion 110 that receives a signal 102 corresponding to a bit stream that includes marks of a predetermined pattern. In an example, the bit stream includes synchronization (sync) marks having a predetermined pattern to frame user data. The receiving and extracting portion 110 processes the signal 102 and extracts the bit stream from the signal 102. According to an aspect of the disclosure, the receiving and extracting portion 110 detects sync marks based on an intermediate signal during processing, instead of the extracted bit stream.

In an embodiment, the receiving and extracting portion 110 includes a pick-up unit 120 and a signal processing circuit 130. The pick-up unit 120 receives the signal 102 and suitably generates an electrical signal 135 in response to the signal 102. The signal processing circuit 130 processes the electrical signal 135, and extracts the bit stream.

It is noted that the signal 102 can be any suitable signal. In an embodiment, the signal 102 is generated in response to a bit stream stored on a storage medium 101. It is noted that the storage medium 101 can be any suitable storage medium. In an example, the storage medium 101 is a hard disk drive that stores the bit stream as magnetic field changes. The pick-up unit 120 includes a magnetic head that generates the electrical signal 135 in response to the magnetic field changes on the storage medium 101. The signal processing circuit 130 processes the electrical signal 135 and extracts the bit stream.

In another example, the storage medium 101 is an optical disc, such as compact disc (CD), digital versatile disc (DVD), Blu-ray disc, and the like, that stores the bit stream as optical property changes. The pick-up unit 120 is an optical pick-up unit that generates the electrical signal 135 in response to the optical property changes. Specifically, the pick-up unit 120 directs a light beam to the storage medium 101. The light beam is reflected from the storage medium 101. The signal 102, which is the reflected light beam, has light properties that correspond to the optical property changes on the storage medium 101. The pick-up unit 120 generates the electrical signal 135 in response to the light properties of the signal 102. The signal processing circuit 130 processes the electrical signal 135 and extracts the bit stream.

In another embodiment, the signal 102 is an electromagnetic signal transmitted in the air, for example, from a base station (not shown). The pick-up unit 120 includes an antenna that suitably generates the electrical signal 135 in response to the electromagnetic signal 102. The signal processing circuit 130 processes the electrical signal 135 and extracts the bit stream.

In the FIG. 1 example, the signal processing circuit 130 includes a pre-decoding portion 131, a decoder 170 and a sync mark detection module 180. The pre-decoding portion 131 processes the electrical signal 135 to prepare the electrical signal 135 for decoding. The pre-decoding portion 131 outputs a data signal 165. The decoder 170 makes bit decisions based on the data signal 165 to extract the bit stream. The sync mark detection module 180 detects sync marks based on the data signal 165.

According to an aspect of the disclosure, the decoder 170 may make wrong bit decisions and throw out useful information for sync mark detection. When sync mark detection is based on the data signal 165 prior to the bit decisions, the sync mark detection can use suitable information in the data signal 165 to reduce detection errors.

It is noted that the electronic system 100 can include other suitable components (not shown), such as processor, user input module, audio/video module, and the like.

Figure 2:
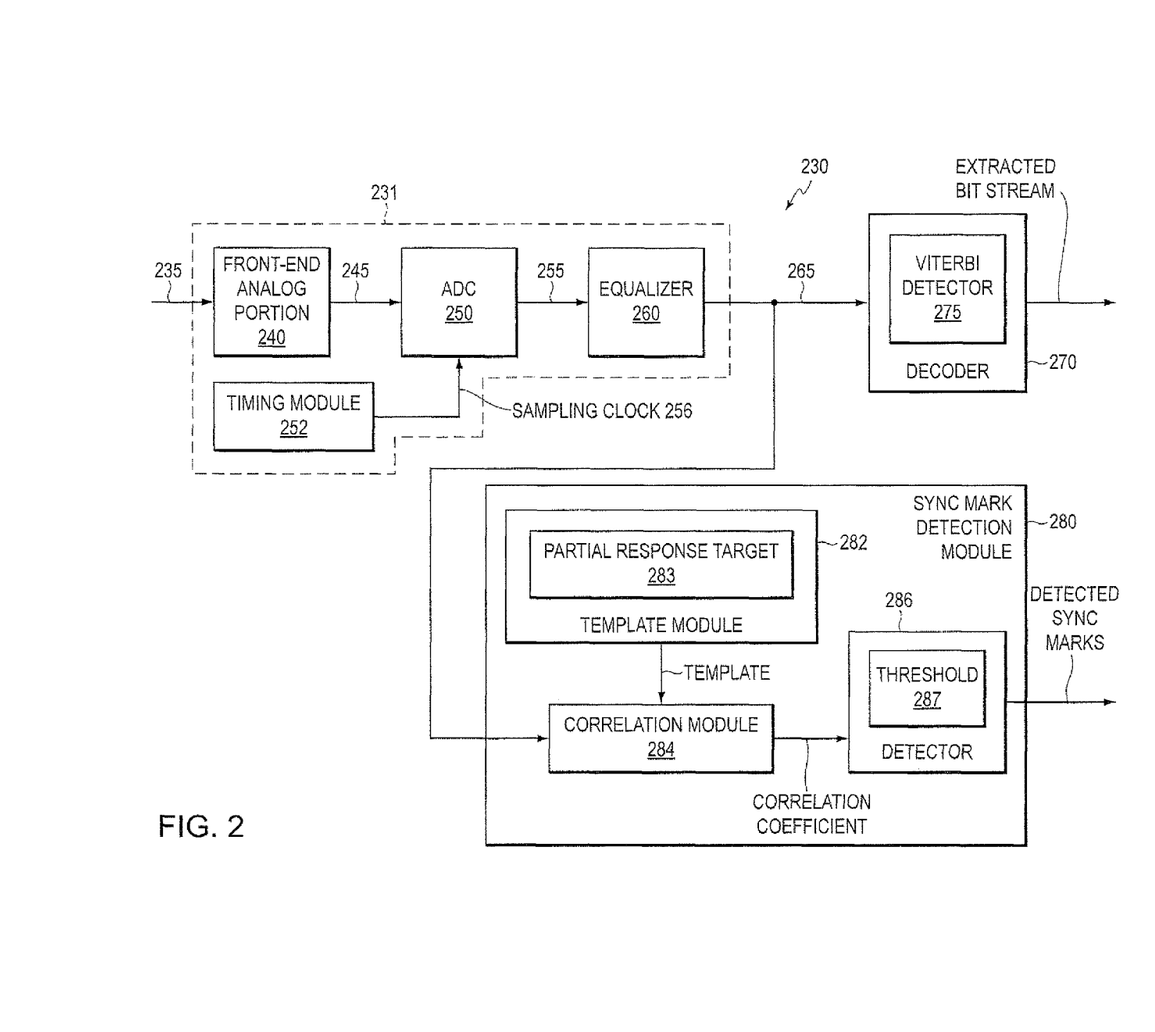
FIG. 2 shows a block diagram of a data read channel example 230 according to an embodiment of the disclosure.

FIG. 2 shows a block diagram of a signal processing circuit example 230 according to an embodiment of the disclosure. The signal processing circuit 230 includes a pre-decoding portion 231, a decoder 270, and a sync mark detection module 280. The pre-decoding portion 231 receives an electrical signal 235, processes the electrical signal 235, and provides a processed electrical signal, such as a data signal 265, to the decoder 270 and the sync mark detection module 280. The decoder 270 makes bit decisions based on the data signal 265 to extract a bit stream. The sync mark detection module 280 detects sync marks based on the data signal 265. These elements are coupled together as shown in FIG. 2.

The pre-decoding portion 231 includes any suitable elements to process the electrical signal 235. In an embodiment, the pre-decoding portion 231 includes a front-end analog portion 240, an analog to digital converter (ADC) 250, a timing module 252, and an equalizer 260. These elements are coupled together as shown in FIG. 2.

The front-end analog portion 240 receives the electrical signal 235, regulates the electrical signal, and outputs an analog data signal 245. The front-end analog portion 240 regulates the electrical signal 235 using analog techniques, such as amplification, compensation for offsets, adjusting an appropriate dynamic range, and the like. Thus, the analog data signal 245 is suitable for subsequent circuit components to handle.

The ADC 250 receives the analog data signal 245 and samples the analog data signal 245 based on a sampling clock 256 provided by the timing module 252. Further, the ADC 250 converts the sampled signal into a digital signal 255. In an embodiment, the timing module 252 and the ADC 250 forms a timing loop. The timing module 252 generates the sampling clock 256 based on the digital signal 255. It is noted that, in another embodiment, the timing loop includes other elements, such as the equalizer 260.

The equalizer 260 receives the digital signal 255, shapes the digital signal 255, and outputs a shaped digital signal, such as the data signal 265. In an embodiment, the equalizer 260 is a finite impulse response (FIR) digital filter that is configured to shape the digital signal 255 according to a partial response target to reduce noises from the digital signal 255 and control inter-symbol interferences. In an example, the partial response target characterizes a channel for conveying the bit stream. For example, the partial response target collectively characterizes a channel that includes the pick-up unit 120 for generating the electrical signal 135 in response to the bit stream read from the storage medium 101 and the pre-decoding portion 165 for processing the electrical signal 135. It is noted that the partial response target can be fixed, programmable or adaptive.

The decoder 270 extracts the bit stream from the data signal 265. The decoder 270 can use any suitable technique to extract the bit stream. In an embodiment, the detector 270 includes a Viterbi detector 275 that makes bit decisions according to a Viterbi algorithm.

The sync mark detection module 280 detects sync marks based on the data signal 265 instead of the extracted bit stream. In an embodiment, the sync mark detection module 280 uses a matched filter to match the data signal 265 with a template that characterizes a sync mark pattern in a channel that conveys the bit stream to detect sync marks from the data signal 265. Specifically, in an embodiment, the sync mark detection module 280 includes a template module 282, a correlation module 284 and a detector 286. These elements are coupled together as shown in FIG. 2.

The template module 282 provides a template that characterizes the sync mark pattern in the channel. In an embodiment, the template is predetermined and stored in a memory (not shown) associated with the template module 282. During operation, the memory provides the stored template.

It is noted that sync marks for different storage media may include different patterns. The template module 282 may store templates in association with corresponding storage mediums. Based on a storage medium, the template module 282 provides the corresponding template for the storage medium.

In another embodiment, the template module 282 includes a partial response target 283 that characterizes the channel for conveying the bit stream. During operation, based on a storage medium, the template module 282 calculates the template for the storage medium by convolving a sync mark for the storage medium with the partial response target 283. It is noted that the partial response target 283 can be programmable or adaptively updated.

It is also noted that the template can be further adjusted to improve sync mark detection accuracy. In an embodiment, the template is weighed according to weight windows to emphasize or deemphasize different portions of the template.

The correlation module 284 calculates correlation coefficients between the data signal 265 and the template. In an example, the template is in a form of a N-tuple vector (N is a positive integer), and the data signal 265 is in a form of a discrete-time signal. At each time point, the most recent N time points of the data signal 265 form a N-tuple data vector, and the correlation module 284 calculates a correlation coefficient between the data vector and the template vector for the time point.

It is noted that the correlation module 284 can use any suitable techniques to reduce calculation complexity. In an example, a correlation coefficient is calculated using Eq. 1:

$$C(X, Y) = \frac{\sum x_i y_i}{\sqrt{(\sum x_i^2)(\sum y_i^2)}} \quad \text{Eq. 1}$$

where X denotes the template vector, and Y denotes the data vector. In an example, the correlation module 284 pre-calculates a Euclidean norm of the template vector ($\Sigma x_i^2$) and stores the Euclidean norm in a memory. Thus, the correlation module 284 uses the stored Euclidean norm of the template vector to calculate the correlation coefficients between the data signal 265 and the template.

The detector 286 compares the correlation coefficients with a threshold 287 to detect sync marks. For example, when an absolute value of a correlation coefficient is larger than the threshold 287, the sync mark detection module 280 detects a sync mark. It is noted that, in an embodiment, the threshold 287 is pre-calibrated to have a reduced number of detection errors.

Figure 3:
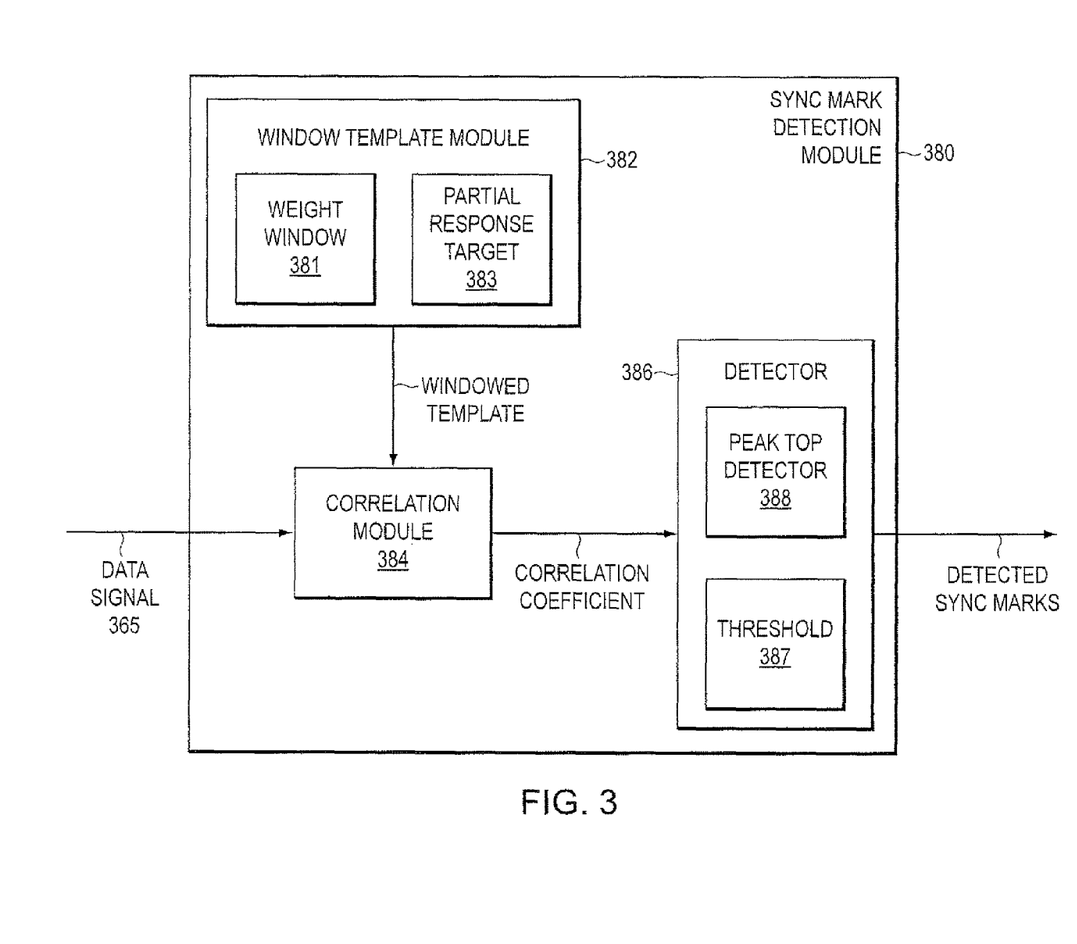
FIG. 3 shows a block diagram of a synchronization (sync) mark detection module 380 according to an embodiment of the disclosure.

FIG. 3 shows a block diagram of a synchronization (sync) mark detection module 380 according to an embodiment of the disclosure. The sync mark detection module 380 includes a window template module 382, a correlation module 384, and a detector 386. These elements are coupled together as shown in FIG. 3.

The window template module 382 stores a partial response target 383 that characterizes a channel for conveying the bit stream and a weight window 381 that defines weights for emphasizing or de-emphasizing different portions of a template. In an embodiment, the window template module 382 convolves the partial response target 383 with a sync mark to calculate a template. Further, the window template module 382 weights the template according to the weight window 381 to determine a windowed template.

The correlation module 384 receives a data signal 365, and calculates correlation coefficients between the data signal 365 and the windowed template.

The detector 386 includes a peak top detector 388 and a threshold 387. The peak top detector 388 detects peak tops in the correlation coefficients that are larger than neighbor correlation coefficients. Then, the detector 386 compares the peak tops with the threshold 387 to detect sync marks.

It is noted that the weighting operation can be performed using other suitable techniques. In an example, the template is not weighted, however, the correlation module 384 is configured to weight different portions differently. For example, the correlation module 384 is configured to heavily weight transition portions, and lightly weight flat portions.

Figure 4:
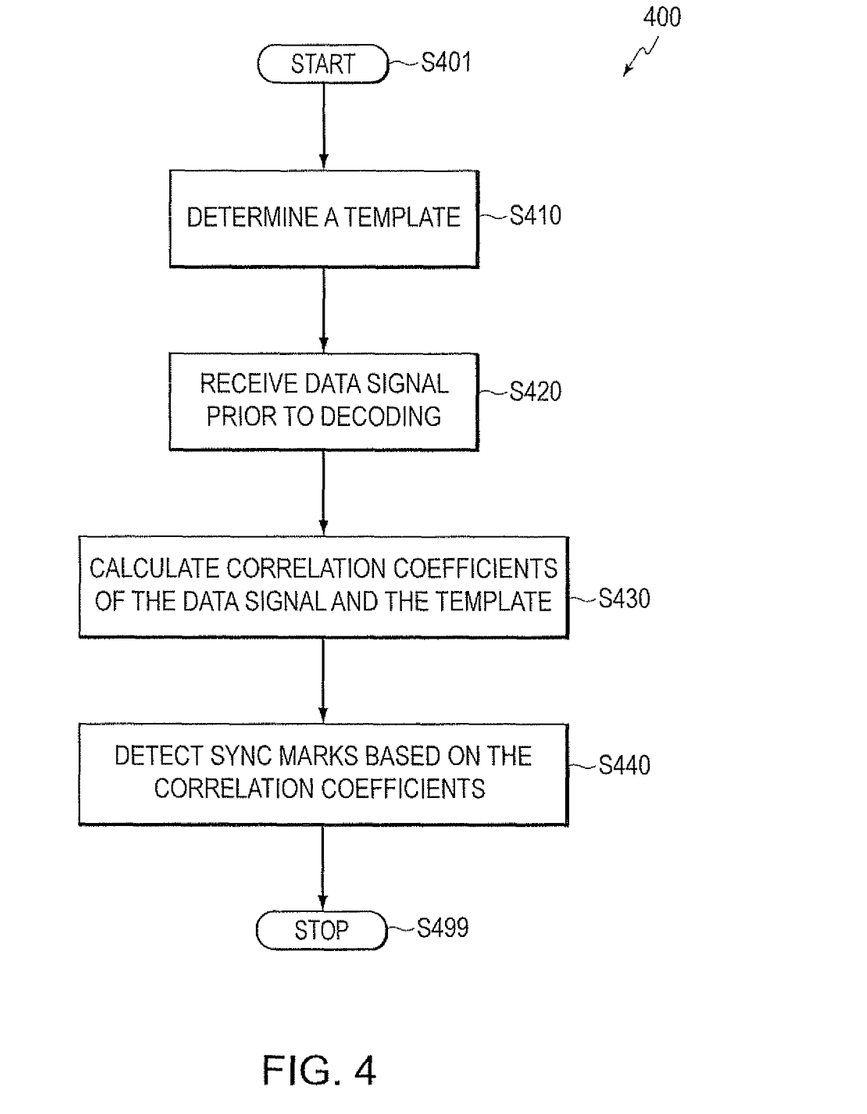
FIG. 4 shows a flow chart outlining a process example 400 for a sync mark detection module to detect sync marks according to an embodiment of the disclosure.

FIG. 4 shows a flow chart outlining a process example 400 for a sync mark detection module, such as the sync mark detection modules 180, 280 and 380, to detect sync marks according to an embodiment of the disclosure. The process starts from S401 and proceeds to S410.

At S410, the sync mark detection module determines a template for sync mark detection. In an example, the sync mark detection module stores predetermined templates in association with storage media in a memory. Then, a storage medium is identified. Based on the identified storage medium, the sync mark detection module reads the stored template in association with the storage medium. For example, an optical disc stores disc and format information, such as disc category, version number, and the like, in a control data zone on the optical disc. The disc and format information can be read to identify the optical disc. Based on the identified optical disc, the sync mark detection module reads the stored template in association with the optical disc.

In another example, the sync mark detection module stores a partial response target that characterizes a channel for conveying a bit stream that includes the sync marks. Further, the sync mark detection module convolves the partial response target with a sync mark for a storage medium to determine a template for the storage medium. In another example, the sync mark detection module weights the template according to weight windows to determine a weighed template.

At S420, the sync mark detection module receives a data signal prior to decoding. The data signal corresponds to a bit stream that uses sync marks to frame user data. In an embodiment, the data signal is output from a pre-decoding portion, such as the pre-decoding portions 131, 231 and the like, that prepares the data signal for decoding. Then, the data signal is input to a decoder, such as a Viterbi decoder, that makes bit decisions to extract the bit stream. Thus, the data signal is an intermediate signal prior to decoding. Information in the data signal can be suitable used to increase sync mark detection accuracy.

At S430, the sync mark detection module calculates correlation coefficients between the data signal and the template. In an example, the template is in the form of a N-tuple vector. The data signal is in the form of a discrete-time signal. At each time point, the data signal of the most recent N time points form a N-tuple data vector, and the sync mark detection module calculates a correlation coefficient between the template vector and the data vector for the time point.

At S440, the sync mark detection module detects sync marks based on the correlation coefficients. In an embodiment, the sync mark detection module detects peak tops in the correlation coefficients. The peak tops are those correlation coefficients that are larger than their neighbor correlation coefficients. Then, the sync mark detection module compares peak tops with a threshold to detect sync marks. For example, the sync mark detection module compares absolute values of the peak tops with the threshold. When an absolute value of a peak top is larger than the threshold, the sync mark detection module detects a sync mark. Then, the process proceeds to S499 and terminates.

Figure 5A:
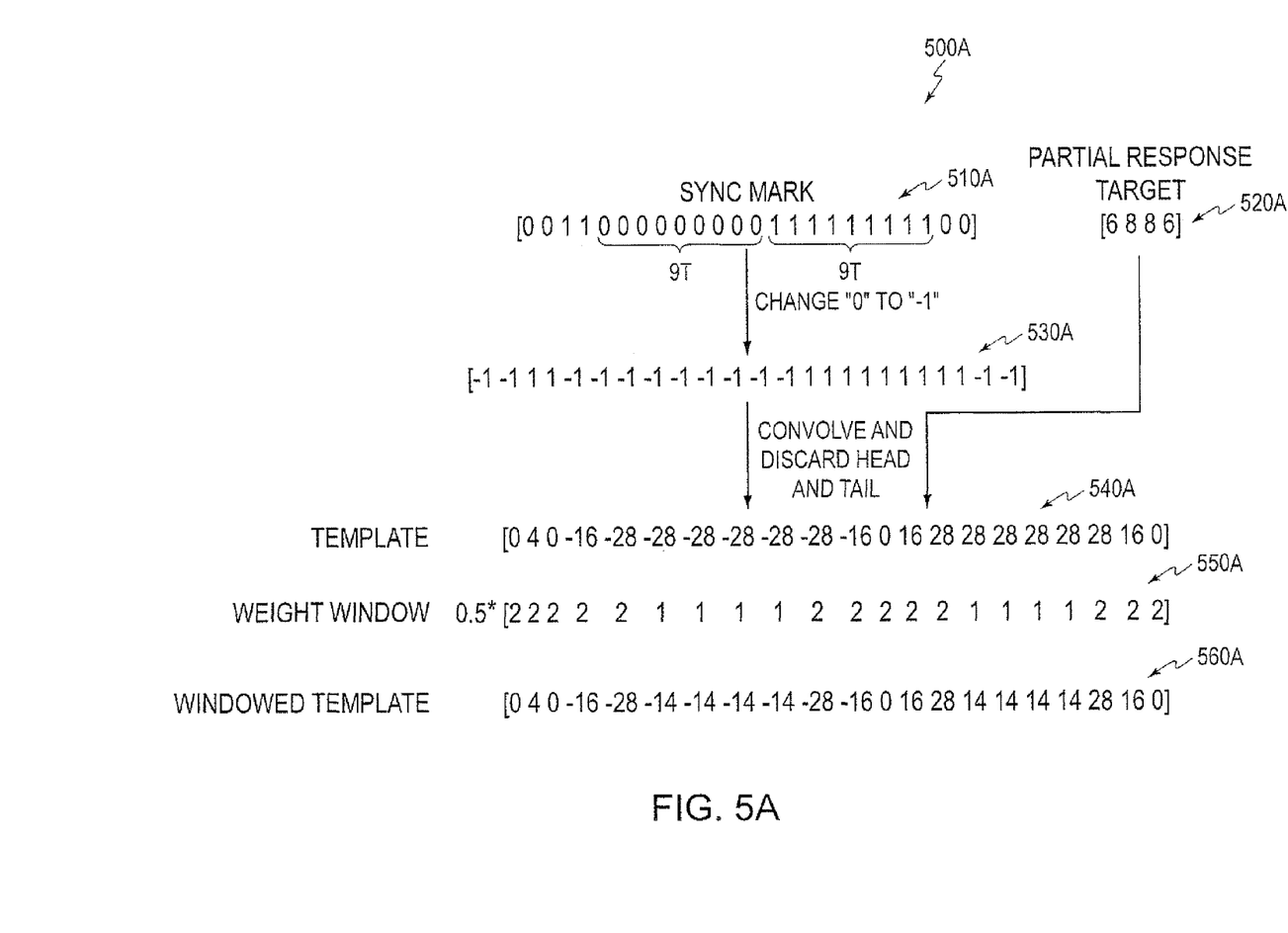
FIG. 5A shows examples of generating sync mark templates according to an embodiment of the disclosure.

FIG. 5A shows an example 500A of generating a windowed template according to an embodiment of the disclosure. In the example, a sync mark 510A includes a 9T9T (nine zeros followed by nine ones or nine ones followed by nine zeros) pattern. The sync mark 510A forms a vector 530A by changing zeros to negative ones. Further, the vector 530A is convolved with a partial response target 520A to determine a template 540A. The template 540A is weighted according to a weight window 550A to calculate the weighted template 560A.

Figure 5B:
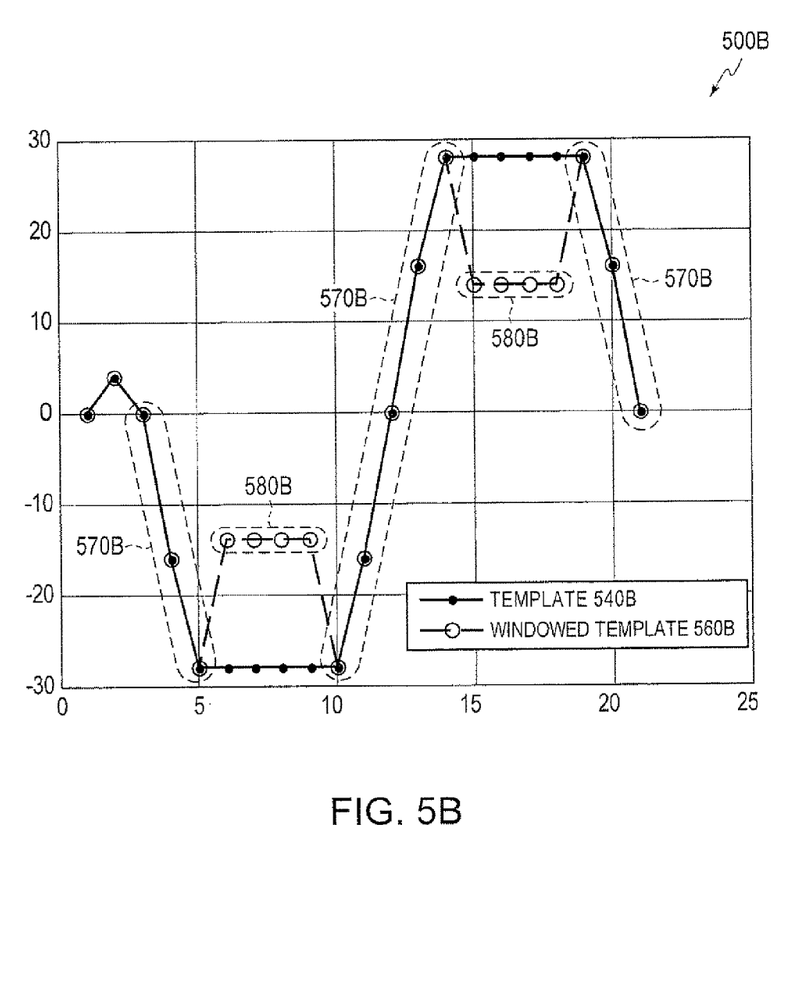
FIG. 5B shows a plot of sync mark templates according to an embodiment of the disclosure.

FIG. 5B shows a plot 500B of the templates in FIG. 5A. The plot 500B includes a first curve 540B corresponding to the template 540A, and a second curve 560B corresponding to the windowed template 560A. The windowed template weights transition portions 570B heavier than the flat portions 580B. Thus, the transition portions 570B are emphasized and the flat portions 580B are de-emphasized.

It is noted that the partial response target 520A is merely an example. Other suitable partial response target is contemplated. It is also noted that the weight window 550A is merely an example. Other suitable weight window is contemplated.

Figure 6A:
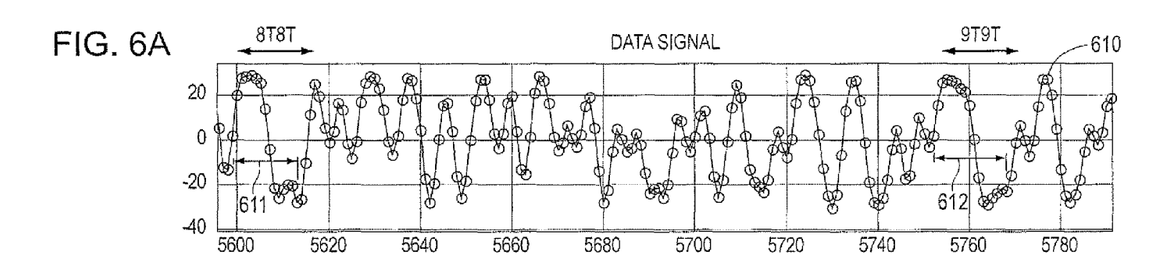
FIGS. 6A-6C show plots of sync mark detection according to an embodiment of the disclosure.
Figure 6B:
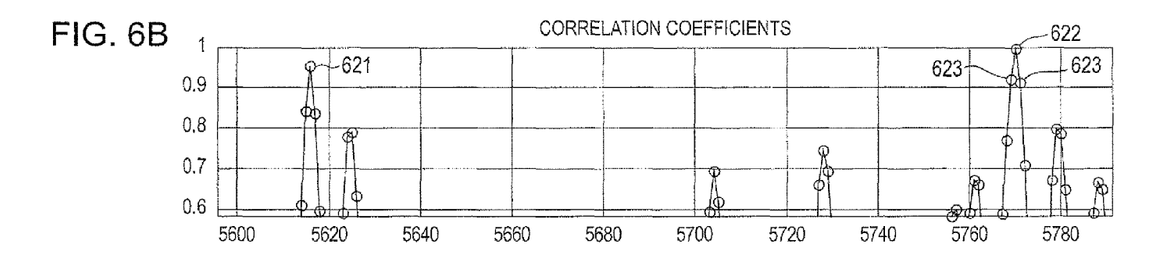
Figure 6C:
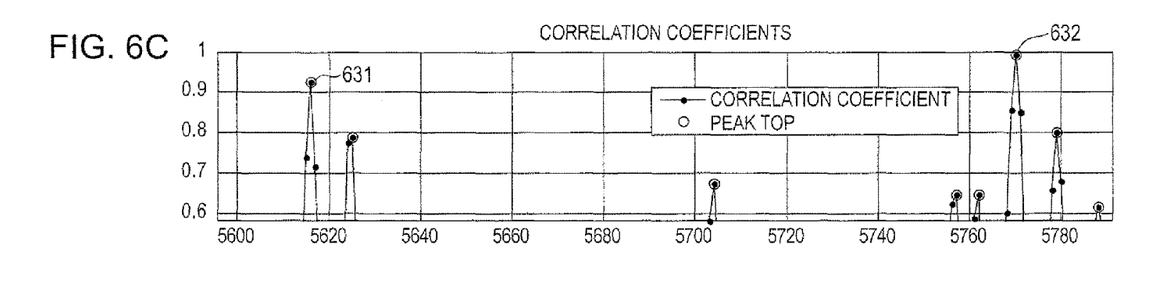

FIGS. 6A-6C show plots for a sync mark detection example according to an embodiment of the disclosure. FIG. 6A shows a data signal 610 in the form of discrete-time signal. In an example, the data signal 610 corresponds to a bit stream read from a Blu-ray disc, and is output from a pre-decoding portion, such as the pre-decoding portion 231. According to a Blu-ray standard, the sync mark includes a 9T9T pattern. In addition, an 8T8T pattern is legal for user data according to the Blu-ray standard. In FIG. 6A, the data signal 610 includes a first portion 611 corresponding to a 8T8T pattern, and a second portion 612 corresponding to a 9T9T pattern.

FIG. 6B shows correlation coefficients between the data signal 610 and the template 540A. The first portion 611 of the data signal 610 has a first correlation coefficient 621 to the template 540A. The second portion 612 of the data signal 610 has a second correlation coefficient 622 to the template 540A. It is noted that a difference between the first correlation coefficient 621 and the second correlation coefficient 622 is relatively small. It is also noted that neighbor coefficients 623 of the second correlation coefficient 622 also has relatively large values. In an embodiment, a threshold is suitably determined to discriminate the first correlation coefficient 621 or the neighbor coefficients 623 from being detected as sync marks.

FIG. 6C shows correlation coefficients between the data signal 610 and the windowed template 560A according to an embodiment of the disclosure. The first portion 611 of the data signal 610 has a third correlation coefficient 631 to the windowed template 560A. The second portion 612 of the data signal 610 has a fourth correlation coefficient 632 to the windowed template 560A.

Due to the reason that the weight window 550A emphasizes the transition portions of template and de-emphasizes the flat portions of the template, the third correlation coefficient 631 is reduced from the first correlation coefficient 621, and a difference between the third correlation coefficient 631 and the fourth correlation coefficient 632 is relatively larger. In an embodiment, a threshold is suitably determined to discriminate the third correlation coefficient 631 from being detected as sync marks.

FIG. 6C also shows peak tops in the correlation coefficients that are larger than neighbor correlation coefficients. The peak tops can be used to discriminate neighbor coefficients from being considered as sync marks.

Figure 7A:
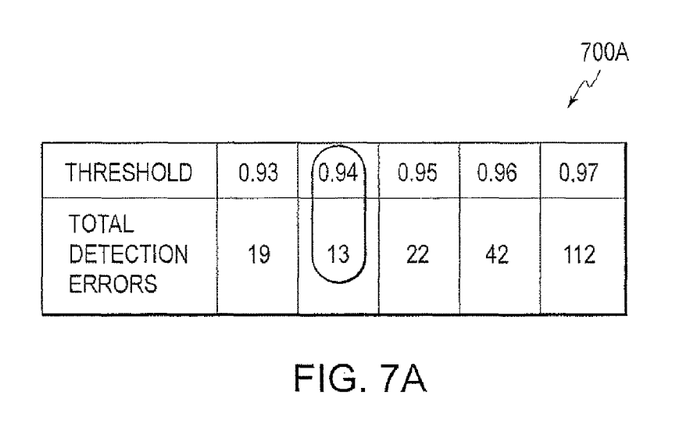
FIG. 7A shows a performance example of an electronic system according to an embodiment of the disclosure.

FIG. 7A shows a performance table 700A of a Blu-ray system example according to an embodiment of the disclosure. The Blu-ray system matches an intermediate signal, such as the data signal 365, with a windowed template of a sync mark having 9T9T pattern to detect sync marks. According to an embodiment of the disclosure, a threshold can be suitably selected to reduce detection errors. Generally, the detection errors include both false detection errors and miss sync errors. When a portion of the data signal 365 does not include a sync mark, and the Blu-ray system detects a sync mark, the Blu-ray system has a false detection error. When a portion of the data signal 365 has a sync mark, and the Blu-ray system doesn't detect the sync mark, the Blu-ray system has a miss sync error.

The numbers of the false detection errors and the miss sync errors depend on the threshold used for sync mark detection. For example, increasing the threshold reduces false detection errors but increases miss sync errors, and reducing the threshold reduces miss sync errors but increases false detection errors. The threshold can be suitably selected to reduce the total number of the detection errors.

The performance table 700A shows total detection errors in association with thresholds using a same input signal to the Blu-ray system. The threshold 0.94 is selected to achieve 13 detection errors in total.

Figure 7B:
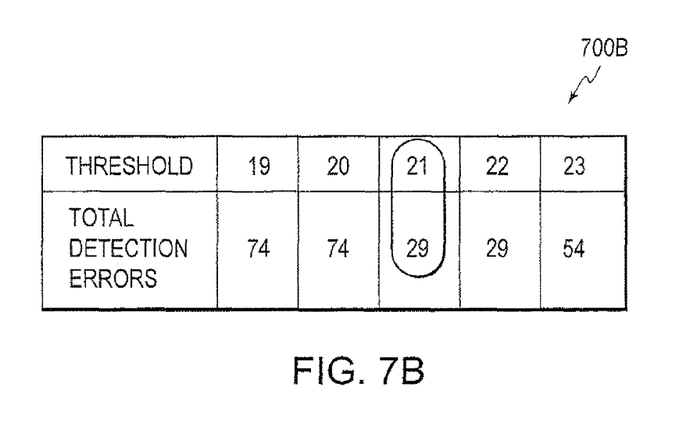
FIG. 7B shows a performance example of a comparison electronic system.

FIG. 7B shows a performance table 700B of a comparison Blu-ray system. The comparison Blu-ray system matches an extracted bit stream with a sync mark pattern, such as 9T9T, to detect sync marks. The performance table 700B shows total detection errors in association with thresholds. It is noted that the same input signal is provided to the Blu-ray system in FIG. 7A and the comparison Blu-ray system in FIG. 7B. According to the performance table 700B, the threshold 21 is selected to achieve 29 detection errors in total.

While the invention has been described in conjunction with the specific embodiments thereof that are proposed as examples, it is evident that many alternatives, modifications, and variations will be apparent to those skilled in the art. Accordingly, embodiments of the invention as set forth herein are intended to be illustrative, not limiting. There are changes that may be made without departing from the scope of the invention.

What is claimed is:

1. A method for detecting marks, comprising:
    receiving a data signal from a channel;
    convolving a predetermined pattern with a partial response target that characterizes the channel to calculate a template; and
    matching the data signal to the template that corresponds to the predetermined pattern transmitted over the channel to detect marks, prior to decoding the data signal into a decoded bit stream.

2. The method of claim 1, wherein matching the data signal to the template further comprises:
    matching the data signal to a sync mark template that corresponds to a sync mark pattern transmitted over the channel to detect sync marks in the data signal, the sync marks being used to frame user data in the data signal.

3. The method of claim 1, wherein matching the data signal to the template further comprises:
    matching the data signal to a non-uniformly weighted template.

4. The method of claim 1, further comprising:
    weighting the template non-uniformly to generate a second template.

5. The method of claim 1, wherein matching the data signal to the template further comprises:
    calculating correlation coefficients between the data signal and the template; and
    detecting the marks based on the correlation coefficients.

6. The method of claim 5, wherein detecting the marks based on the correlation coefficients further comprises:
    detecting peak tops in the correlation coefficients that are larger than neighboring correlation coefficients; and
    comparing the peak tops to a threshold to detect the marks.

7. The method of claim 5, wherein calculating the correlation coefficients between the data signal and the template further comprises:
  storing a pre-calculated Euclidean norm of the template; and
  calculating the correlation coefficients using the stored Euclidean norm of the template.

8. The method of claim 1, wherein matching the data signal to the template further comprises:
  matching the data signal to the template to detect the marks, prior to using Viterbi decisions to decode the data signal.

9. A signal processing circuit, comprising:
  a pre-decoding portion configured to receive a signal corresponding to a bit stream that includes marks having a predetermined pattern, process the signal, and output a data signal for decoding;
  a decoder configured to decode the data signal into a decoded bit stream;
  a template module configured to convolve a sync mark pattern with a partial response target that characterizes a channel over which the data signal is transmitted to calculate a sync mark template; and
  a mark detection module configured to match the data signal to the sync mark template that corresponds to the predetermined pattern to detect the marks.

10. The signal processing circuit of claim 9, wherein the template module is configured to non-uniformly weight the sync mark template to generate a second sync mark template.

11. The signal processing circuit of claim 9, wherein the mark detection module further comprises:
  a correlation module configured to calculate correlation coefficients between the data signal and the template; and
  a detector configured to detect the marks based on the correlation coefficients.

12. The signal processing circuit of claim 11, wherein the detector is configured to detect peak tops of the correlation coefficients that are larger than neighboring correlation coefficients, and compare the peak tops to a threshold to detect the marks.

13. An electronic system, comprising:
  a pick-up unit configured to generate a signal corresponding to a bit stream, the bit stream including marks having a predetermined pattern;
  a pre-decoding portion configured to process the signal, and output a data signal for decoding;
  a decoder configured to decode the data signal into a decoded bit stream;
  a template module configured to convolve a sync mark pattern with a partial response target that characterizes a transmission channel over which the data signal is transmitted to calculate a sync mark template; and
  a mark detection module configured to match the data signal to the sync mark template that corresponds to the predetermined pattern to detect the marks.

14. The electronic system of claim 13, wherein the pick-up unit is configured to generate the signal in response to at least one of an electromagnetic signal transmitted over air, magnetic field changes on a magnetic storage medium, and optical property changes on an optical storage medium.

15. The electronic system of claim 13, wherein the template module is configured to non-uniformly weight the sync mark template to generate a second sync mark template.

16. The electronic system of claim 13, wherein the mark detection module further comprises:
  a correlation module configured to calculate correlation coefficients between the data signal and the template; and
  a detector configured to detect the marks based on the correlation coefficients.

17. The electronic system of claim 16, wherein the detector is configured to detect peak tops of the correlation coefficients that are larger than neighboring correlation coefficients, and compare the peak tops to a threshold to detect the marks.

* * * * *